(12) United States Patent
Singh et al.

(10) Patent No.: US 11,068,526 B2
(45) Date of Patent: Jul. 20, 2021

(54) OBTAINING ENHANCED METADATA FOR MEDIA CONTENT

(71) Applicant: Caavo Inc, Milpitas, CA (US)

(72) Inventors: Amrit P. Singh, Bangalore (IN); Sravan K. Andavarapu, Jeypore (IN); Jayanth Manklu, Bengaluru (IN); Anu Godara, Bangalore (IN); Vinu Joseph, Bengaluru (IN); Vinod K. Gopinath, Bangalore (IN); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 259 days.

(21) Appl. No.: 16/257,966

(22) Filed: Jan. 25, 2019

(65) Prior Publication Data

US 2019/0236090 A1    Aug. 1, 2019

(30) Foreign Application Priority Data

Jan. 26, 2018  (IN) .............................. 201841003131

(51) Int. Cl.
| | |
|---|---|
| G06F 17/00 | (2019.01) |
| G06F 16/41 | (2019.01) |
| G06F 16/483 | (2019.01) |
| H04N 21/25 | (2011.01) |
| G06N 20/00 | (2019.01) |
| H04N 21/235 | (2011.01) |

(52) U.S. Cl.
CPC ............ *G06F 16/41* (2019.01); *G06F 16/483* (2019.01); *G06N 20/00* (2019.01); *H04N 21/2353* (2013.01); *H04N 21/251* (2013.01)

(58) Field of Classification Search
None
See application file for complete search history.

(56) References Cited

U.S. PATENT DOCUMENTS

| | | | | |
|---|---|---|---|---|
| 8,229,748 | B2 * | 7/2012 | Chang ................. | G09B 21/006 704/260 |
| 2013/0326573 | A1 * | 12/2013 | Sharon ................. | H04H 60/73 725/115 |
| 2018/0173756 | A1 * | 6/2018 | Lawton ............... | G06F 16/2228 |

* cited by examiner

*Primary Examiner* — Thu N Nguyen
(74) *Attorney, Agent, or Firm* — Fiala & Weaver P.L.L.C.

(57) ABSTRACT

Methods, systems, and computer program products are provided for obtaining enhanced metadata for media content searches. In one embodiment, computer program logic embodies a metadata receiver and a media content metadata matcher and combiner. The metadata receiver receives program metadata for a plurality of programs from a plurality of metadata sources. The media content metadata matcher and combiner is configured to perform a matching process whereby metadata associated with each of the plurality of programs is compared to metadata of each of the other plurality of programs to determine if the compared programs are the same program and if so, to combine the metadata from each program into a single program including enhanced metadata and store such in a database. A subsequent search for a program corresponding to the stored program returns at least some of the metadata associated with the program, and that enables accessing the program.

20 Claims, 8 Drawing Sheets

OBTAINING ENHANCED METADATA FOR MEDIA CONTENT

CROSS-REFERENCE TO RELATED APPLICATIONS

This application claims priority to Indian Provisional Patent Application No. 201841003131, filed Jan. 26, 2018, the entirety of which is incorporated by reference herein.

BACKGROUND

The number of entertainment sources is an ever-growing list. Furthermore, the availability of media content (movies, shows, music, etc.) from different online sources consumed by the user on different endpoints (TVs, computers, mobiles, etc.) is also growing rapidly. However, since most sources have their own unique metadata to describe the same content, it is a challenge to present both the best metadata and all the over-the-top (OTT) content for a program as one entity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for obtaining enhanced metadata for media content searches, as well as other services such as recommendations, watchlists, DVR playlists, and the like. A system in accordance with one embodiment includes one or more processors and one or more memory devices connected to the one or more processors. The one or more memory devices store computer program logic for execution by the one or more processors and the computer program logic includes a metadata receiver and a media content metadata matcher and combiner. The metadata receiver is configured to receive program metadata for a plurality of programs from a plurality of metadata sources. The media content metadata matcher and combiner is configured to perform a matching process whereby metadata associated with each of the plurality of programs is compared to metadata of each of the other plurality of programs to determine if the compared programs are the same program, and in response to determining that the compared programs are the same program, generating a combined program including enhanced program metadata by combining at least a portion of the program metadata associated with each program. The media content metadata matcher and combiner is further configured to store the combined program in a database.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
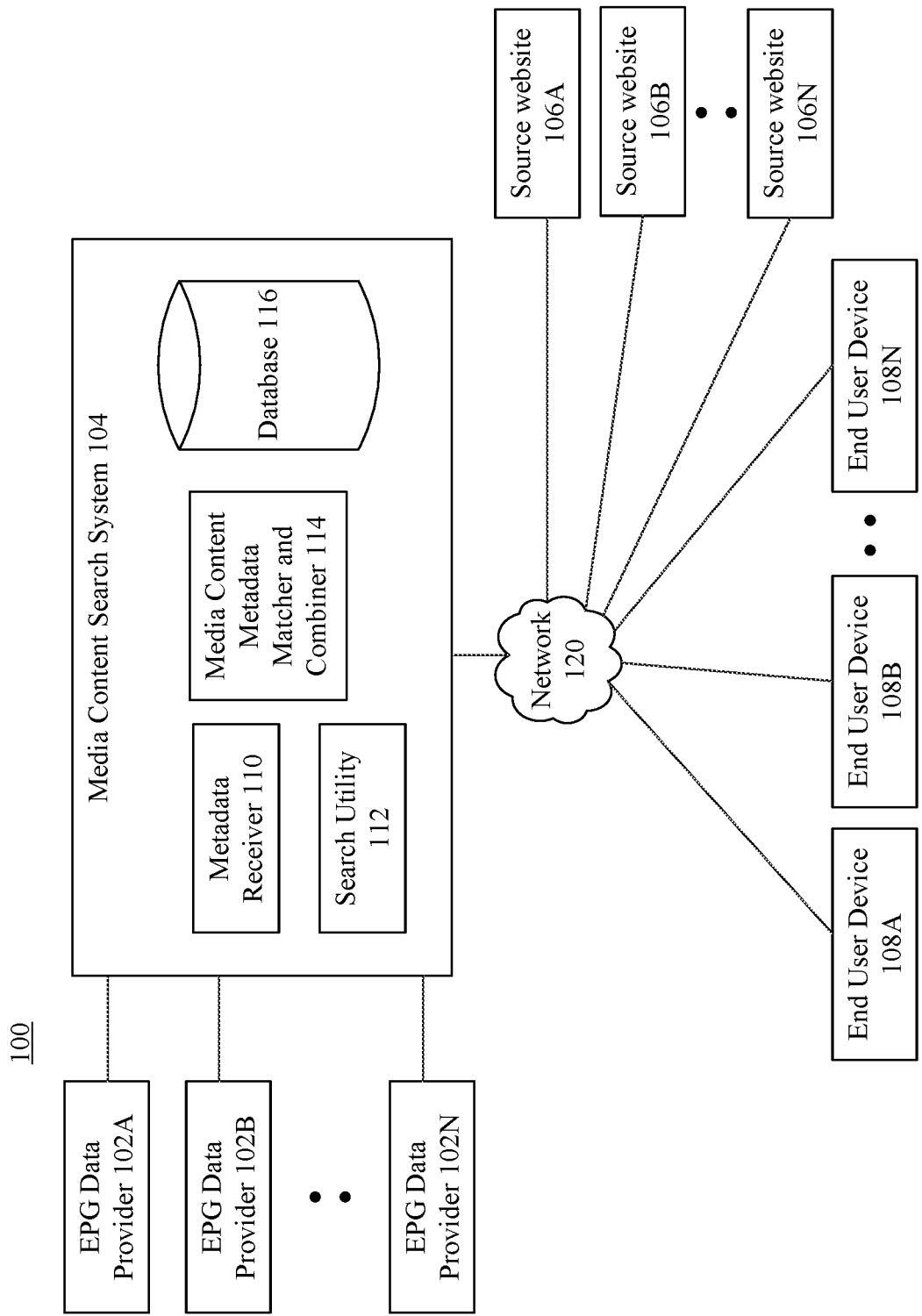
FIG. 1 depicts a system for obtaining enhanced metadata for a media content search in accordance with embodiments described herein.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The example embodiments described herein are provided for illustrative purposes, and are not limiting. The examples described herein may be adapted to any type of targeted crawling system. Further structural and operational embodiments, including modifications/alterations, will become apparent to persons skilled in the relevant art(s) from the teachings herein.

Example embodiments are described herein that are directed to obtaining enhanced metadata for media content search. An item of media content may include, for example, a movie, a television (TV) show, or an episode of a TV show, but may also encompass audio content (e.g., albums, songs, podcasts), video games, software applications or any other type of media content. Hereinafter from place to place, an item of media content may also be referred to as a "program." It should be understood, however, that a "program" is not limited to movies, TV shows, broadcasts or episodic media content of any kind, and a "program" may include any other type of media content.

FIG. 1 depicts a system 100 for obtaining enhanced metadata for a media content search in accordance with an embodiment. As shown in FIG. 1, system 100 includes electronic program guide (EPG) data providers 102A-102N, a media content search system 104, a plurality of end user devices 108A-108N, and a plurality of source websites 106A-106N. Media content search system 104 includes a metadata receiver 110, a search utility 112, a media content metadata matcher and combiner 114, and a database 116. It should be noted that there can be any number of end user devices and/or source websites present in system 100.

End user devices 108A-108N, source websites 106A-106N, and media content search system 104 are all communicatively coupled via network 120. Network 120 may comprise one or more networks such as local area networks (LANs), wide area networks (WANs), enterprise networks, the Internet, etc., and may include one or more of wired and/or wireless communication links. EPG data providers 102A-102N are further coupled to media content search system 104. Such coupling between components may be wired, wireless, or a combination thereof and may be, for example, over network 120. It should be noted that one or more of the components of media content search system 104 may be implemented on the same device or may each be implemented on its own device. Furthermore, each of these components of media content search system 104 may be implemented in hardware (e.g., as digital and/or analog circuits), as software (e.g., as computer programs executed by one or more processors), or as a combination of hardware and software. These and other features of system 100 will now be discussed.

In an embodiments, EPG data providers 102A-102N are systems that provide data that is typically consumed by an electronic program guide ("EPG"). An EPG may be displayed by various types of television sets, digital video or personal video recorders, set-top-boxes or other types of end user devices configured to deliver media content to a consumer. In embodiments, the EPG may be an application or applet that is running on the television or end user device, and that displays a list of current and/or upcoming programs available for viewing on each channel or media content source. In other embodiments, however, the EPG data may be displayed in a browser window on the television display, or the display of some other end user device such as a smartphone or tablet. The listing of programs also typically includes a short summary and/or description for each program. In embodiments, EPG data providers 102A-102N may each comprise a server or other entity that is accessed by metadata receiver 110 via a network (e.g., the Internet) or some other communication channel EPG data providers 102A-102N may be configured to provide periodically-updated or intermittently-updated EPG data. The EPG data may be published by a variety of different media broadcasting entities, such as DirectTV®, AT&T®, Comcast®, or the like, although these examples are not intended to be limiting. Although discussed herein in terms of EPG data, it will be appreciated that program metadata provided by EPG data providers 102A-102N need not be used or even intended to be used in an EPG. Instead, EPG data providers 102A-102N may comprise any source of media content or program metadata to be used for any purpose.

End user devices 108A-108N are intended to represent devices that enable users to interact with media content search system 104 and may include handheld devices as well as stationary devices. Examples of handheld devices include television remote controls, universal remotes, smart phones, tablet devices, and other devices that can be held in a person's hand or hands. Examples of stationary devices include televisions, set-top-boxes (STBs), satellite TV receiver boxes, DVD players, digital video recorders (DVRs), and other devices too large to be easily carried by a human, and that are intended to operate in a stationary location. In embodiments, STBs may comprise hardware provided for use with conventional satellite or cable multi-channel television providers such as, for example, DIRECTV or Comcast. In other embodiments, however, a STB may comprise end user devices configured to receive programs and other media from over-the-top (OTT) content providers. OTT content providers stream programs and media over the Internet directly from content provider to end user. Examples of STBs suitable for receiving OTT content may include, for example, an Apple TV, Roku, Chromecast, Nvidia Shield, and the like, although these examples are not intended to be limiting. In embodiments, an end users may interact with each of end user devices 108A-108N to provide commands, queries, etc., in various ways, such as by a text input, a voice command, etc.

In an embodiment, one or more of end user devices 108A-108N comprise an HDMI switching device such as that described in commonly-owned U.S. Pat. No. 9,749,552, issued Aug. 29, 2017 and entitled "Automatic Identification and Mapping of Consumer Electronic Devices to Ports on an HDMI Switch", the entirety of which is incorporated by reference herein. In accordance with such an embodiment, the HDMI switching device is connected to a television or other display device and provides a user interface through such display device by which a user can search for items of media content. Search queries submitted by the end user are passed by the HDMI switching device to media content search system 104 and enhanced metadata about items of media content that are responsive to the search query are passed back to the HDMI switching device for display via the connected display device. If the end user selects one of the items of media content, the HDMI switching device can utilize a content ID and/or other information provided by or otherwise accessible to media content search system 104 to initiate playback of the media content by one of end user devices 108A-108N, the media playback being in turn displayed to the end user via the HDMI switching device on the connected display device.

End users of end user devices 108A-108N are enabled to search for media content based on enhanced metadata about such media content, the enhanced metadata being stored by, or otherwise made available to, media content search system 104, in embodiments. This enhanced metadata may also be provided to the user for viewing thereof, e.g., via one of end user devices 108A-108N or a display that is connected thereto. Such enhanced metadata about media content, discussed in detail hereinafter, may be obtained by performing a matching and combining process on different metadata received from different content providers such as entertainment content metadata provider(s) (e.g., Gracenote®, Rovi®, etc.), video content provider(s) (e.g., Hulu®, Netflix®, HBO®, Youtube®, Amazon®, etc.), web-based information provider(s) (e.g., IMDB®), and audio content provider(s) (e.g., Rhapshody®, Runes®, Last.fm®, etc.). For instance, each of source websites 106A-106N may comprise websites that are published by providers of media content (e.g., Netflix®, Hulu®, Amazon®, HBOGO®, etc.) and that provide a means for accessing digital media content (or information about such digital media content) thereon. Furthermore, such media content metadata may be obtained from a DVR or other recording device that stores recorded media content and comprises or is connected to one of end user devices 108A-108N. Such media content metadata may further be obtained from EPG data providers 102A-102N and/or a device that is connected to one of end user devices 108A-108N via a LAN or other local connection. In an embodiment, such a LAN connected device may comprise, for example, a PLEX Media Server, or the like, although this example is not intended to be limiting.

In embodiments, media content search system 104 may be configured to obtain different metadata associated with an item of media content or program from multiple sources such as, for example, EPG data providers 102A-102N. Media content search system 104 may also be configured to combine portions of the obtained metadata to generate and store enhanced metadata in a database. Such combination is only performed if it is determined that the different metadata are each associated with the same item of media content or program.

For instance, with respect to FIG. 1, metadata receiver 110 is configured to receive first metadata associated with an item of media content from a first metadata source. In embodiments, and as noted above, the first metadata source may be any entity capable of providing metadata associated with the item of media content. For instance, the first metadata source may be any of EPG data providers 102A-102N, each of which may be an entertainment content metadata provider, a video content provider, an EPG data provider, a web-based information provider, an audio content provider, a recorded content provider, or network-based content provider (e.g., an OTT content provider). In embodiments, the first metadata source may provide metadata in different ways. For example, metadata may be received in the form of a "data dump" whereby metadata is provided as raw data. Alternatively, the first metadata source may expose an API that permits metadata receiver 110 to programmatically receive metadata on an as needed basis.

In embodiments, the first metadata includes information that identifies or describes the item of media content. For instance, the first metadata may comprise EPG data that may specify or identify items of media content and corresponding information. For example, such metadata may include the title, air time, air date, premiere date, actors, directors, ratings, network, production company, channel, OTT link (a playlist, URL or other reference to the OTT content or program, and which enables download, streaming or otherwise access the OTT content), or any data associated with a particular item of media content or program. As such, and with reference to FIG. 1, metadata receiver 110 may obtain the first metadata from EPG data providers 102A-102N. Alternatively, and with reference to FIG. 1, metadata receiver 110 may obtain the first metadata from any one of end user devices 108A-108N. Furthermore, and with continued reference to FIG. 1, metadata receiver 110 may obtain the first metadata from any one of source websites 106A-106N.

Metadata receiver 110 is further configured to receive second metadata associated with the item of media content from a second metadata source that is different than the first metadata source. In embodiments, the second metadata source may be any source or entity that is different than the first metadata source, and is capable of providing metadata associated with the item of media content. Like the first metadata, the second metadata may include information that identifies or describes the item of media content. Like the first metadata source, the second metadata source may be an entertainment content metadata provider, a video content provider, an EPG data provider, a web-based information provider, an audio content provider, a recorded content provider, or a network-based content provider (e.g., an OTT content provider). For instance, and with reference to FIG. 1, metadata receiver 110 may receive the second metadata from EPG data providers 102A-102N, any one of end user devices 108A-108N, or any one of source websites 106A-106N.

Media content metadata matcher and combiner 114 is configured to generate enhanced metadata associated with the item of media content based on the received first and second metadata. In an embodiment, media content metadata matcher and combiner 114 is configured to perform a matching process based on at least the first metadata and the second metadata to determine that the first metadata and the second metadata are both associated with the same item of media content. For instance, media content metadata matcher and combiner 114 may perform a matching process based on first metadata obtained from EPG data providers 102A-102N and second metadata obtained from end user device 108A to determine that the first metadata and the second metadata are both associated with the same item of media content, although this is only one non-limiting example. Furthermore, in response to determining that the first metadata and the second metadata are both associated with the same item of media content, media content metadata matcher and combiner 114 is configured to combine at least a portion of the first metadata and at least a portion of the second metadata to generate third metadata associated with the item of media content and store the third metadata in a database. For instance, in further accordance with the previous example, media content metadata matcher and combiner 114 may generate third metadata based on first metadata obtained from EPG data providers 102A-102N and second metadata obtained from end user device 108A and store the third metadata in database 116.

Media content metadata matcher and combiner 114 may perform this matching process in various ways for various items of media content. For example, when the item of media content is a movie, the matching process may comprise one or more of: determining if a first title in the first metadata matches exactly a second title in the second metadata; determining a distance between the first title and the second title, for instance, by applying a process that determines a measure of similarity between the two titles, determining if the first title partially matches the second title, comparing a first release date in the first metadata to a second release date in the second metadata, comparing a first release year in the first metadata to a second release year in the second metadata, comparing first cast and crew information in the first metadata to second cast and crew information in the second metadata, comparing a first audio language in the first metadata to a second audio language in the second metadata, or comparing a first OTT link in the first metadata to a second OTT link in the second metadata.

In addition to comparing first and second OTT links, embodiments of media content metadata matcher and combiner 114 may also be configured to evaluate whether the OTT links are valid. That is, media content metadata matcher and combiner 114 may determine whether the OTT links enable accessing the OTT content associated therewith. In one embodiment, and as described above, the OTT link may comprise a URL for the associated media content. Accordingly, media content metadata matcher and combiner 114 may attempt to retrieve or stream the media at the URL of the OTT link. One or both of the OTT links of first and second metadata may not be valid or otherwise functional, in which case embodiments of media content metadata matcher and combiner 114 can determine which OTT link (if any) to include in the merged, third metadata. A proper vetting of the OTT links may of course improve the experience of the end user who is not frustrated by being offered a dead link. But also, overall system function and efficiency is enhanced because of reduced storage and processing requirements afforded by culling out unnecessary metadata.

In another example, like when the item of media content is a television show, the matching process may comprise one or more of: determining if a first title in the first metadata matches exactly a second title in the second metadata, determining a distance between the first title and the second title, for instance, by applying a process that determines a measure of similarity between the two titles, determining if the first title partially matches the second title, comparing a first premiere date in the first metadata to a second premiere date in the second metadata, comparing a first airdate in the first metadata to a second airdate in the second metadata, comparing first cast and crew information in the first metadata to second cast and crew information in the second metadata; comparing a first audio language in the first metadata to a second audio language in the second metadata, comparing a season count in the first metadata to a season count in the second metadata, or comparing a number of episodes in the first metadata to a number of episodes in the second metadata.

In yet another example, like when the item of media content is an episode of a television show, the matching process may comprise one or more of: determining if a first title in the first metadata matches exactly a second title in the second metadata, determining a distance between the first title and the second title, for instance, by applying a process that determines a measure of similarity between the two titles, determining if the first title partially matches the second title, comparing a first premiere date in the first metadata to a second premiere date in the second metadata, comparing a first airdate in the first metadata to a second airdate in the second metadata, comparing a first season number in the first metadata to a second season number in the second metadata, or comparing a first episode number in the first metadata to a second episode number in the second metadata.

In another embodiment, and more generally, media content metadata matcher and combiner 114 may perform matching process by computing a feature comparison score for the first metadata and second metadata. In particular, for each metadata field (e.g., title, release year, etc.) shared by the first metadata and second metadata may be compared and a numeric score generated. For example, the title metadata field of first and second metadata may be compared and scored based on the Levenshtein distance between the titles. The Levenshtein distance between two words, such as program titles, is the minimum number of single-character edits (i.e. insertions, deletions or substitutions) required to change one word to the other word. In an embodiment, where we let L be the Levenshtein distance between the title metadata fields of the first and second metadata, a comparison score S on (0,1] may be computed as:

$$S = \frac{1}{1+L} \quad (1)$$

Where the title metadata fields are identical, the Levenshtein distance L between them will be 0, and accordingly, S will be 1. Thus, a comparison score of 1 indicates a perfect match. Likewise, it can be appreciated that the more different the title metadata fields are, the greater the Levenshtein distance L between them and, accordingly, S must get smaller owing to the inverse relationship shown in equation (1) shown just above. If necessary, and as understood in the art, the Levenshtein distance L may be normalized to permit direct comparison of two different scores S even where the words used to generate each score were of different length.

This technique of computing scores based on Levenshtein distance may likewise be applied to any text metadata fields shared by the first and second metadata. For example, the Director metadata fields in the first and second metadata may be compared and a score generated (assuming, of course, that the corresponding an item of media content or program has only one Director). In the case of numeric metadata fields such as the release year of a movie, a comparison score S on (0,1] may be computed as shown in equation (1) above but instead of computing a Levenshtein distance for L, one may simply compute and use the numeric difference between the release years.

In some instances, first and second metadata will include multiple entries for the same metadata type or field. For example, first and second metadata may each include a list of actors for the program. In an embodiment, a comparison score for actors may be computed by determining the fraction of actors in common between the first and second metadata. That is, supposing first and second metadata each list eight actors, the comparison score may be computed by taking the quotient of the number of actors in common to the total number of actors. In this example, where there are eight actors being compared and six are determined to be the same, the comparison score would be 6/8 or 0.75. Where 8 of 8 are the same, the comparison score is 1. Thus again, in this manner, a comparison score S on (0,1] may be computed. Of course, a determination of whether two actors are the same actor may proceed by computing the Levenshtein distance between their names.

It should be understood that the use of Levenshtein distance as discussed above is merely exemplary, and other methods of assessing similarity may be employed in various embodiments. For example, cosine similarity techniques may usefully be employed in embodiments.

In this general manner, a set of comparison scores may be generated for the first and second metadata wherein the scores reflect a measure of similarity between them. These measures may be used in various ways to assess whether two programs are the same. For example, embodiments may compute the average of the comparison scores and determine that the first and second metadata correspond to the same program where the average exceeds a predefined threshold. In another embodiment, and as will be discussed in more detail below, comparison scores may be used to train a machine learning model wherein the suitably trained machine learning model may thereafter accept a set of comparison scores as input, and generate the most probable program matches as output.

Database 116 is stored in one or more suitable memory devices. Database 116 may be configured to store both received and enhanced metadata associated with items of media content. In an embodiment, database 116 stores a content ID for each item of media content that can be used to access such item of media content from a content provider website or service for playback. Thus, for example, when an end user of an end user device 108A-108N wishes to watch an item of media content, the content ID can be retrieved from database 116 and passed to the content provider website or service to quickly retrieve the content. In the embodiment shown in FIG. 1, database 116 is configured to maintain received metadata and enhanced metadata relating to items of media content wherein such information is retrieved from various sources, including EPG data providers 102A-102N, end user devices 108A-108N, and source websites 106A-106N.

Search utility 112 is configured to enable users of end user devices 108A-108N to perform a targeted search for media content within database 116. For instance, search utility 112 is configured to receive a search request from a user of one of end user devices 108A-108N. In response to the search request, search utility 112 may identify the item of media content based at least on the aforementioned third metadata (i.e., enhanced metadata) stored in database 116. In an embodiment, search utility 112 is further configured to provide the third metadata associated with the item of media content, or a portion thereof, to one of end user devices 108A-108N for presentation to the end user. In another embodiment, search utility 112 is configured to provide a means for accessing the item of media content (e.g., that is identified in response to a user search) on the end user device 108A-108N for access by the end user.

Figure 2:
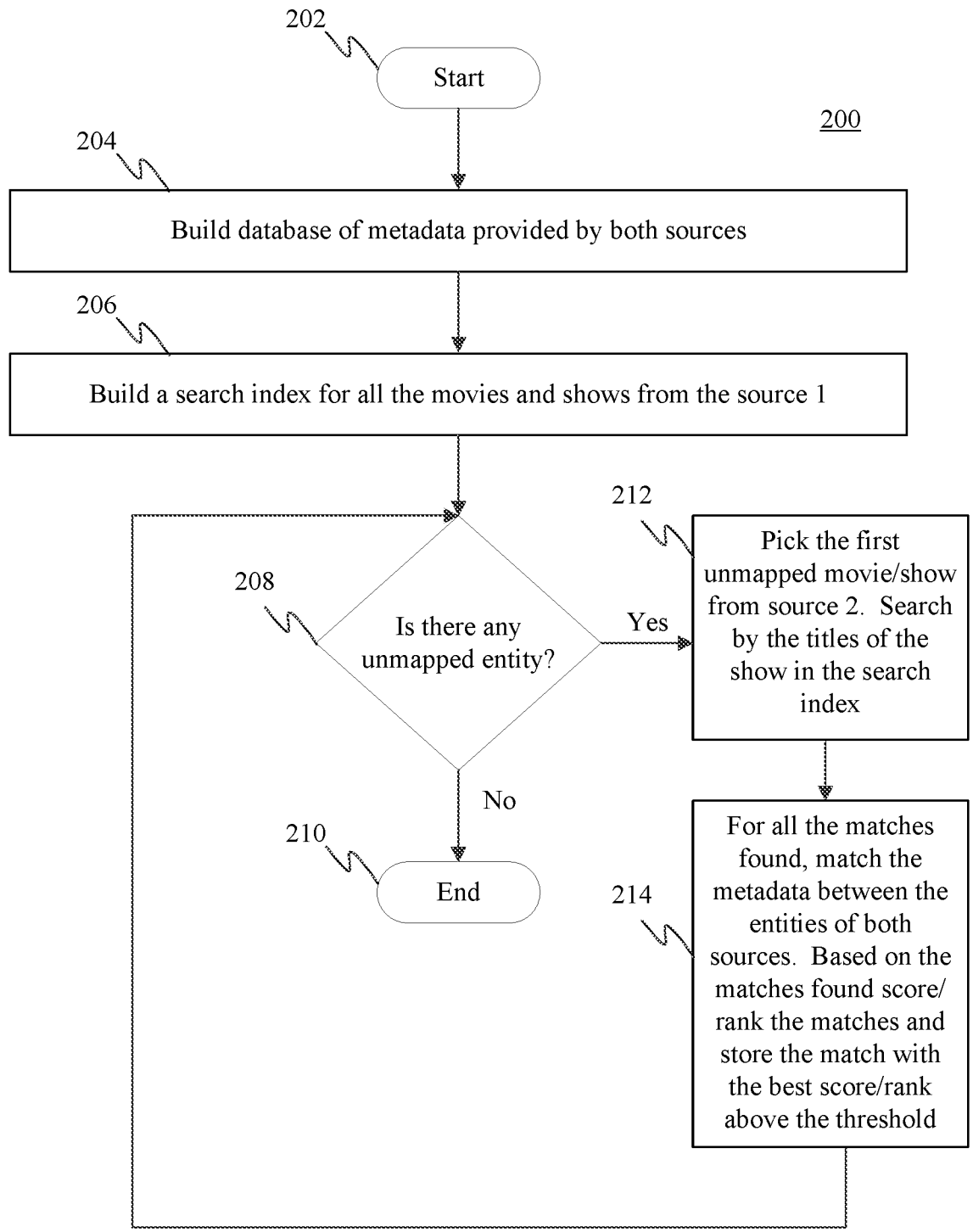
FIG. 2 depicts a flowchart of an example method for matching and combining program metadata to generate enhanced program metadata in accordance with embodiments described herein.

One example manner of operation of system 100 will now be further described as follows with respect to FIG. 2. In particular, FIG. 2 shows a flowchart 200 of an example method for obtaining enhanced metadata for a media content search, in accordance with an embodiment. In an embodiment, system 100 of FIG. 1 may operate according to flowchart 200. Further structural and operational embodiments will be apparent to persons skilled in the relevant art(s) based on the discussion regarding flowchart 200. The method of flowchart 200 is described as follows.

The method of flowchart 200 begins with step 202. In step 202, the method of flowchart 200 starts.

At step 204, a database of metadata associated with various movies and shows provided by two different metadata sources is built. In accordance with one or more embodiments, the two sources include different ones of one or more of entertainment content metadata provider(s), video content provider(s), entertainment program guide(s), Web-based information provider(s), audio content provider(s), recorded content provider(s); and/or network-based content provider(s). For example, with reference to FIG. 1, database 116 is built including metadata associated with items of media content from EPG data providers 102A-102N and metadata associated with items of media content from end user device 108A (in one non-limiting example).

At step 206, a search index for all the movies and shows from the first metadata source is built. For example, and with reference to FIG. 1, embodiments of media content metadata matcher and combiner 114 may be configured to build a search index for all movies and shows from EPG data providers 102A-102N. A search index is a body of structured data that a search engine refers to when looking for results that are relevant to a specific query. In an embodiment, the search index may be keyed by, for example, the title of each movie. That is, the title of each movie functions as a search key that may be used for subsequent searches of the search index. In other embodiments, however, a different metadata field, or more than one metadata field, may be used as a search key when building the search index.

At decision step 208, it is determined if there is any unmapped entity. For example, and with reference to FIG. 1, it is determined if there is any unmapped entity in database 116 for the metadata associated with items of media content from end user device 108A.

At step 212, in response to a determination that there is an unmapped entity, the first unmapped movie/show from the second metadata source is picked and the search index is searched by the title of the movie/show. For example, and with reference to FIG. 1, metadata associated with an unmapped movie from end user device 108A is picked and the search index built in step 206 is searched by title to determine matches.

At step 214, for all the matches found, entities in the metadata of both sources are matched according, in embodiments, a comparison and scoring process similar to that described above. That is, the matches are scored/ranked and the match with bests score/rank above a given threshold is stored. For instance, and with reference to FIG. 1, a match may be determined between a show in a search index built based on metadata from EPG data providers 102A-102N and several unmapped programs as identified by metadata from end user device 108A, wherein the matches are determined based on program title. For each match between the show in the search index and an unmapped program, metadata obtained for the show from the EPG data providers 102A-102N is compared to metadata obtained for the show from end user device 108A. Each match between the show in the search index and an unmapped entity is assigned a score/rank and the match having the highest score/rank above a predefined threshold is stored in database 116. After step 214, the method of flowchart 200 returns to decision step 208.

At decision step 208, if it is determined if there are any more unmapped entities (programs), in which cases steps 212 and 214 are performed again in the manner described above. However, if it is determined in decision step 208 that that there are no remaining unmapped programs, then the method of flowchart 200 proceeds to step 210. At step 210, the method of flowchart 200 ends.

Figure 3:
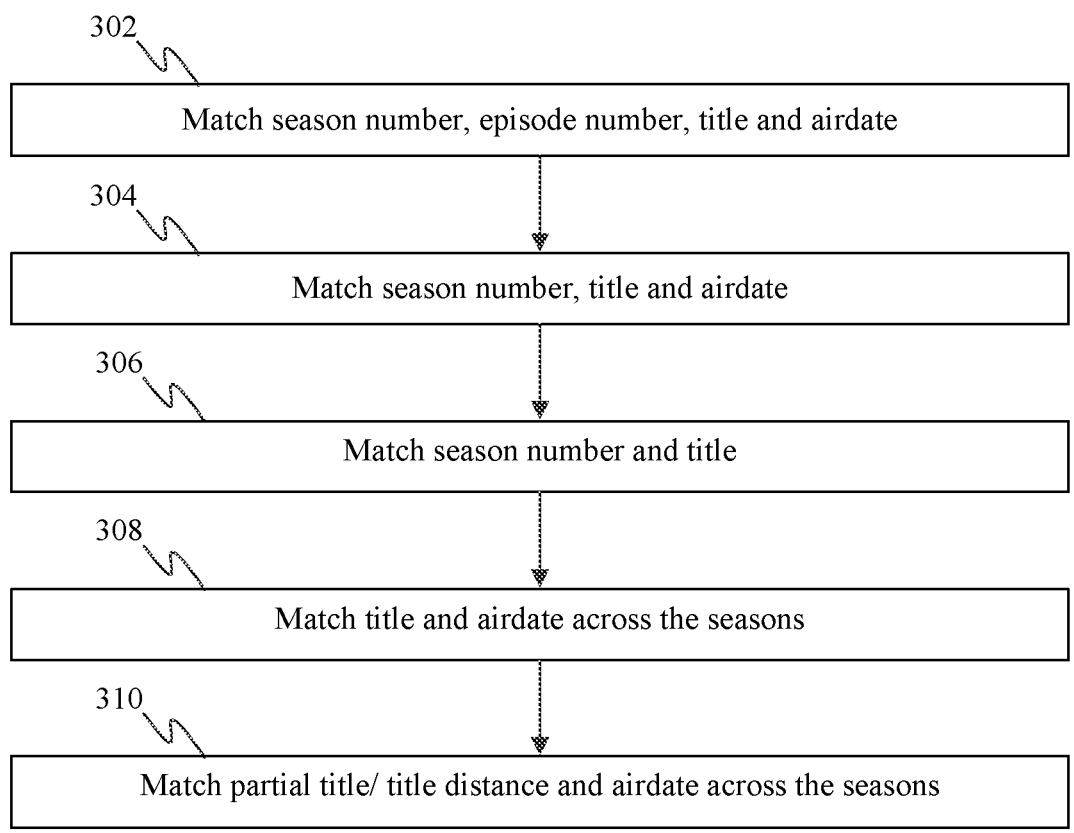
FIG. 3 depicts a flowchart of an example method for matching program metadata in accordance with embodiments described herein.

The operation of system 100 will now be further described as follows with respect to FIG. 3. In particular, FIG. 3 shows a flowchart 300 of an example method for performing a matching process for first and second metadata, in accordance with an embodiment. In each of the steps of flowchart 300, various entities that appear in first metadata from a first metadata source and second metadata from a second metadata source are matched. The method of flowchart 300 may be performed, for example, as part of performing step 214 of flowchart 200 as described above. In an embodiment, system 100 of FIG. 1 may operate according to flowchart 300. Further structural and operational embodiments will be apparent to persons skilled in the relevant art(s) based on the discussion regarding flowchart 300. The method of flowchart 300 is described as follows.

The method of flowchart 300 begins with step 302. In step 302, season number, episode number, title and airdate are matched. For instance, and with reference to FIG. 1, media content metadata matcher and combiner 114 first compares and tries to match a season number, an episode number, a title and an airdate between the first and second metadata. However, if this is not possible, the method of flowchart 300 moves to step 304.

In step 304, season number, title and airdate are matched. For instance, and with reference to FIG. 1, media content matcher and combiner 114 compares and tries to match a season number, a title, and an airdate between the first and second metadata. However, if this is not possible, the method of flowchart 300 moves to step 306.

In step 306, season number and title are matched. For instance, and with reference to FIG. 1, media content matcher and combiner 114 compares and tries to match season number and title between the first and second metadata. However, if this is not possible, the method of flowchart 300 moves to step 308.

In step 308, title and airdate across the seasons are matched. For instance, and with reference to FIG. 1, media content matcher and combiner 114 compares tries to match title and airdate without regard to any particular season between the first and second metadata. However, if this is not possible, the method of flowchart 300 moves to step 310.

In step 310, a partial title and/or title distance and airdate across the seasons are matched. For instance, and with reference to FIG. 1, media content matcher and combiner 114 compares and tries to match a partial title/title distance and airdate without regard to any particular season between the first and second metadata. In embodiments, title distance may be determined as the Levenshtein distance between the titles of first and second metadata. However, if this is not possible, it may be determined that the first metadata and second metadata are not a match.

Figure 4:
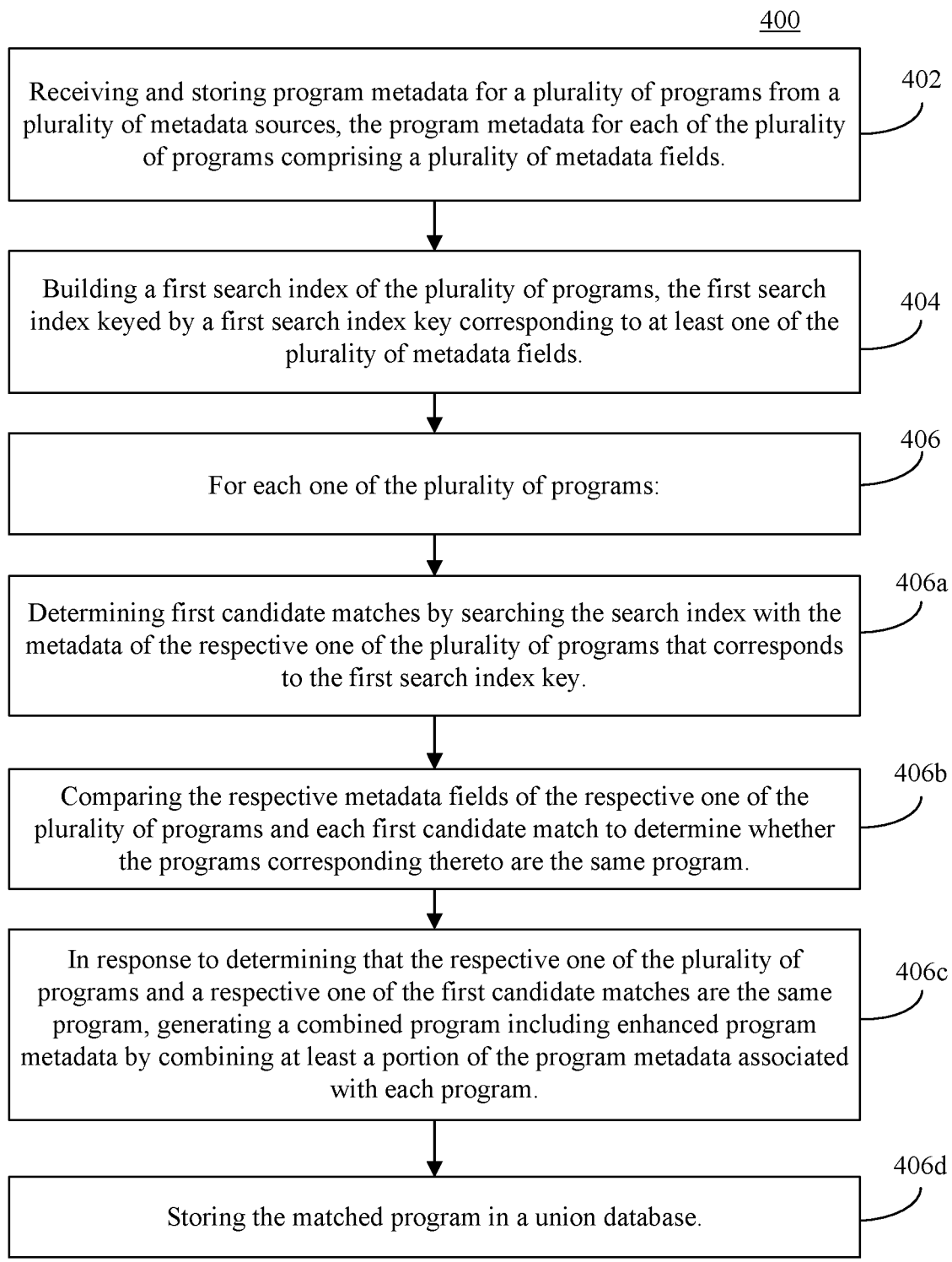
FIG. 4 depicts another flowchart of an example method for matching and combining program metadata to generate enhanced program metadata in accordance with embodiments described herein.

The operation of system 100 will now be further described as follows with respect to FIG. 4. In particular, FIG. 4 shows a flowchart 400 of an example method for matching and combining program metadata to generate enhanced program metadata, in accordance with an embodiment. In an embodiment, system 100 of FIG. 1 may operate according to the method of flowchart 400. Further structural and operational embodiments will be apparent to persons skilled in the relevant art(s) based on the discussion regarding flowchart 400. The method of flowchart 400 is described as follows.

The method of flowchart 400 begins with step 402. In step 402, program metadata for a plurality of programs from a plurality of metadata sources is received and stored, where the program metadata for each of the plurality of programs comprises a plurality of metadata fields. For example, and with reference to FIG. 1, metadata receiver 110 receives program metadata associated with a plurality of programs (i.e., items of media content) from a plurality of metadata sources such as EPG data providers 102A-102N, and subsequently stores the program metadata (e.g., organized on a per program basis) in database 116. For example, program metadata may be stored in a table of a relational database where each row corresponds to a program, and the columns correspond to the metadata fields associated with each program. The metadata of each program may identify the program and include additional information about the media content as discussed above.

In step 404, a first search index of the plurality of programs is built, the first search index keyed by a first search index key corresponding to at least one of the plurality of metadata fields. For example, and with reference to FIG. 1, media content metadata matcher and combiner 114 may be configured to create a search index of the plurality of programs in database 116, and in the general manner discussed above in relation to step 206 of flowchart 200. For example, media content metadata matcher and combiner 114 may use the title of each program as the first search index key when creating the search index. In other embodiments, however, media content metadata matcher and combiner 114 may create the search index using a metadata field other than the program title as the first search index key.

Flowchart 400 of FIG. 4 continues at step 406. At step 406, embodiments perform operations on each of the plurality of programs. In particular, each of steps 406a-406d are performed in turn on each of the plurality of programs as discussed herein below. In embodiments, media content metadata matcher and combiner 114 may be configured to retrieve each row of the relational table discussed above, and perform each of steps 406a-406d in turn using metadata contained therein. That is, embodiments of media content metadata matcher and combiner 114 may be configured iteratively loop over steps 406a-406d, with each iteration scoped to a different one of the plurality of programs and its corresponding row in the relational table.

At step 406a, first candidate matches are determined by searching the search index with the metadata of the respective one of the plurality of programs that corresponds to the first search index key. For example, with reference to FIG. 1, embodiments of media content metadata matcher and combiner 114 may retrieve the title metadata field from respective one of the programs (i.e., from the program currently being processed) from its corresponding row in the relational table, and search the search index by that title name. Accordingly, such a search will return rows of the database corresponding to programs whose titles are a close match to the title of the one of the plurality of programs currently being processed, those rows comprising the first candidate matches.

Flowchart 400 of FIG. for continues at step 406b. At step 406b, the respective metadata fields of the respective one of the plurality of programs and each first candidate match are compared to determine whether the programs corresponding thereto are the same program. For example, and with reference to FIG. 1, embodiments of media content metadata matcher and combiner 114 are configured to compare the metadata fields of the respective one of the plurality of programs (i.e., from the program currently being processed) against the metadata corresponding to each program that is a candidate match to determine if the two programs are the same. Embodiments of media content metadata matcher and combiner 114 may perform the comparison and matching process in one or more ways as described above in the description of system 100 of FIG. 1. For example, the comparison and matching processes may be based at least in part on a computed comparison score S based on the Levenshtein distance L between one or more metadata fields of each program.

At step 406c, in response to determining that the respective one of the plurality of programs and a respective one of the first candidate matches are the same program, a combined program is generated, the combined program including enhanced program metadata by combining at least a portion of the program metadata associated with each program. For example, and with reference to FIG. 1, when embodiments of media content metadata matcher and combiner 114 determine that the respective one of the plurality of programs (i.e., the program currently being processed in this iteration) matches one of the first candidate matches. We refer to such matching programs herein below as "matched programs." After determining that the above-mentioned programs are matched programs, media content metadata matcher and combiner 114 may be configured to generate a combined program by merging the metadata fields of the matched programs where possible.

Merging the fields of matched programs may be done in a number of ways. In one embodiment, for example, the combination of metadata may comprise the logical union the metadata of each matched program. For example, metadata fields that are common to (i.e., match one another) each matched program are simply copied wholesale into the combined program. Further, metadata fields of each matched program that are included in only one of the matched programs may be merged into the combined program. Additionally, certain metadata fields of each matched program that overlap, but are not coextensive, may also be merged into the combined program. For example, each matched program may include some, but not all, cast members of the program. Taking this example further, one of the matched programs may include metadata identifying Laurence Fishburne, Keanu Reeves and Hugo Weaving as cast members, whereas the other matched program identifies Keanu Reeves, Hugo Weaving and Carrie-Anne Moss. In such an instance, media content metadata matcher and combiner 114 may be configured to combine cast members common to both matched programs with cast members unique to each program. In the example above, the combined program would identify Laurence Fishburne, Keanu Reeves, Hugo Weaving and Carrie-Anne Moss as cast members. When embodiments merge metadata in this manner, the combined program reflects the union of the metadata of the matched Flowchart 400 continues at step 406d. At step 406d, the combined program is stored in a union database. For example, and with reference to FIG. 1, embodiments of media content metadata matcher and combiner 114 may be configured to store the combined program in a database instance on database 116 that includes only programs that reflect a union of metadata from other programs (i.e., reflect matched programs). In another embodiment, however, the combined program may be stored in the same or a different table of the database that stores the plurality of programs discussed above. When stored in the same table as the matched programs, the combined program may be inserted and the matched programs deleted, in embodiments.

At the conclusion of step 406d, where additional programs of the plurality of programs have yet to be processed, embodiments are configured to loop back and start processing with another of the plurality of programs at step 406a. When all programs of the plurality of programs has been processed by steps 406a-406d, each of the plurality of programs have been compared to all the other programs of the plurality of programs, and the union database contains only programs that reflect matched programs.

Figure 5:
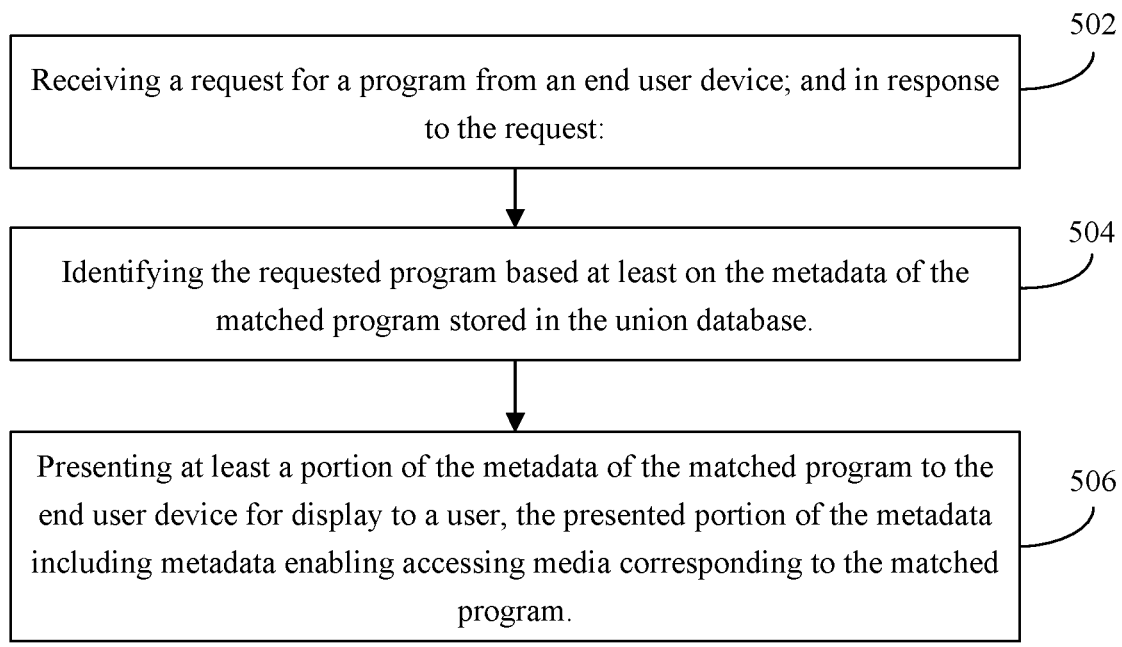
FIG. 5 depicts a flowchart of another example method for obtaining enhanced program metadata for a media content search in accordance with embodiments described herein.

The operation of system 100 will now be further described as follows with respect to FIG. 5. In particular, FIG. 5 shows a flowchart 500 of an example method for obtaining enhanced program metadata for a media content search, in accordance with an embodiment. In an embodiment, system 100 of FIG. 1 may operate according to the method of flowchart 500 and in conjunction with the method of flowchart 400. Further structural and operational embodiments will be apparent to persons skilled in the relevant art(s) based on the discussion regarding flowchart 500. The method of flowchart 500 is described as follows.

The method of flowchart 500 begins with step 502. In step 502, a request for a program is received from an end user device. For example, and with reference to FIG. 1, search utility 112 of media content search system 104 receives a request from one of end user devices 108a-108n. Such a request may comprise, for example, the title of a program or the genre of the program (e.g., football). In response to the request, an embodiment of search utility 112 may proceed as shown in steps 504 and 506.

At step 504, the requested program is identified based at least on the metadata of the matched program stored in the union database. For example, and with reference to FIG. 1, search utility 112 of media content search system 104 is configured to search the union database for possible matching programs, and to identify the requested program from among the possible matches based at least in part on the metadata corresponding to that program. For example, the request from the end user may comprise the name of a program, and the requested program is identified by searching the union database by that name (e.g., for example, "The Matrix"). In embodiments, the search may return an identifier for each program match generated by the search, and search utility 112 may subsequently retrieve the programs and/or metadata associated therewith using such identifiers. Search utility 112 may, in embodiments, examine the metadata of programs in the union database to see if at least a portion of the metadata for a given program matches (or is sufficiently similar to) "The Matrix," and if so, to identify the given program as the requested program.

Flowchart 500 concludes at step 506. At step 506, at least a portion of the metadata of the matched program is presented to the end user device for display to a user, the presented portion of the metadata including metadata enabling accessing media corresponding to the matched program. For example, and with reference to FIG. 1, after search utility 112 identifies the requested program in the union database as the matched program, search utility 112 is configured to transmit the metadata corresponding to the matched program to the end user device 108a-108n from which the request of step 502 was sent, in embodiments. The end user device may then display at least some of the metadata for the end user to read and/or select. In embodiments, the metadata includes metadata such as, for example, an OTT link that, as described above, enables accessing the program corresponding to the matched program. The inclusion of an OTT link is merely exemplary, and other types of metadata that enable accessing a program may be included in program metadata.

Figure 6:
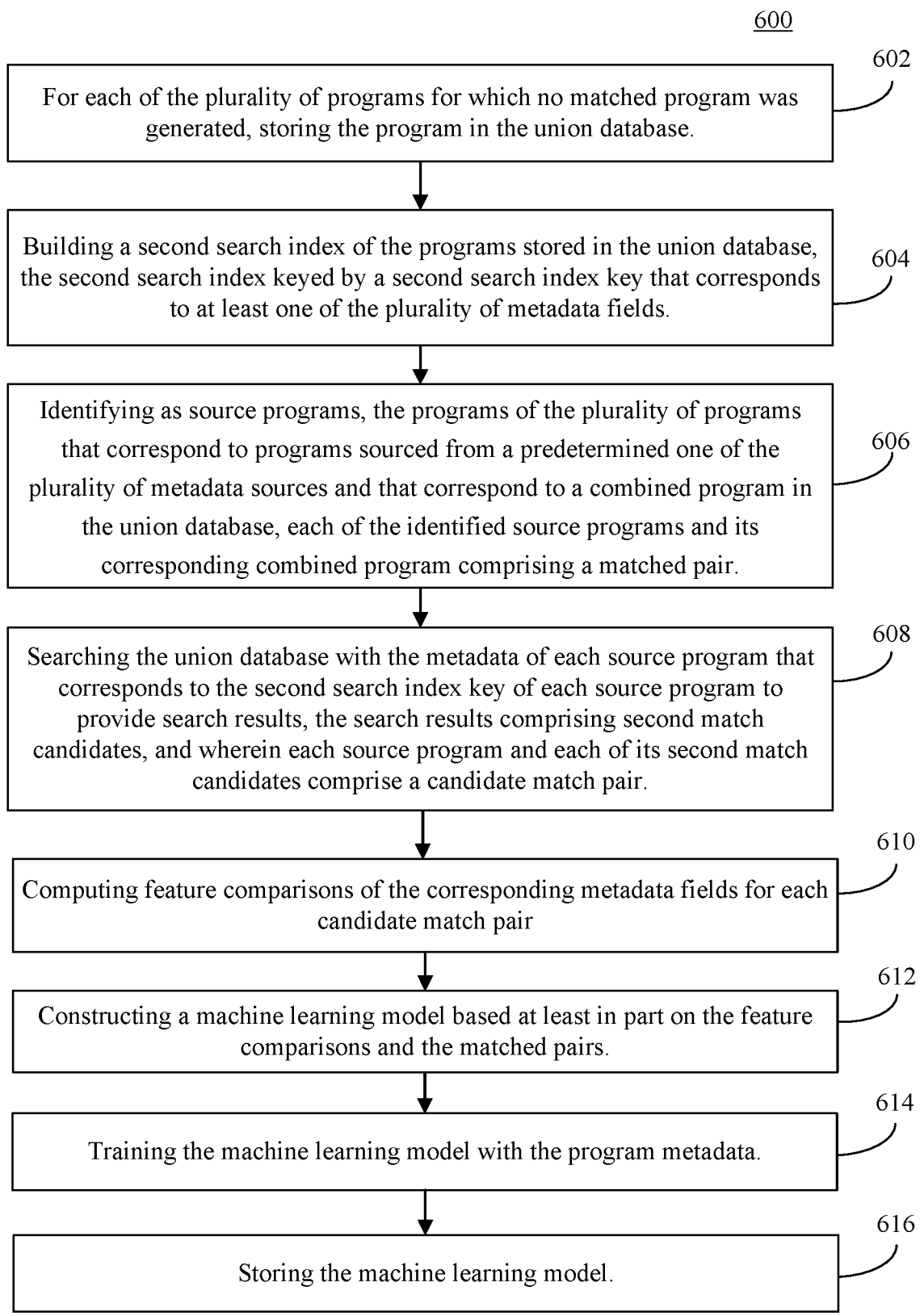
FIG. 6 depicts a flowchart of an example method for generating, training and storing a machine learning model for matching and combining program metadata to generate enhanced program metadata, in accordance with embodiments described herein.

The operation of system 100 will now be further described as follows with respect to FIG. 6. In particular, FIG. 6 depicts a flowchart of an example method for generating, training and storing a machine learning model for matching and combining program metadata to generate enhanced program metadata, in accordance with an embodiment. In an embodiment, system 100 of FIG. 1 may operate according to the method of flowchart 600 and in conjunction with the method of flowchart 400. Further structural and operational embodiments will be apparent to persons skilled in the relevant art(s) based on the discussion regarding flowchart 600. The method of flowchart 600 is described as follows.

The method of flowchart 600 begins with step 602. In step 602, for each of the plurality of programs for which no matched program was generated, the program is stored in the union database. For example, and with reference to FIGS. 1 and 4, embodiments of media content metadata matcher and combiner 114 may be configured to first perform the steps of flowchart 400 at the conclusion of which, the union database contains only matched programs. At step 602, embodiments of media content metadata matcher and combiner 114 are further configured to add the remaining programs of the plurality of programs that did not form the basis for any matched program stored in the union database. These additional unmatched programs are added to the union database for reasons related to training a machine learning model, and as will be discussed in further detail herein below.

Flowchart 600 of FIG. 6 continues at step 604. At step 604, a second search index of the programs stored in the union database is built, the second search index keyed by a second search index key that corresponds to at least one of the plurality of metadata fields. For example, and with reference to system 100 of FIG. 1, flowchart 200 of FIG. 2, and flowchart 400 of FIG. 4, embodiments of media content metadata matcher and combiner 114 may be configured to create a search index of the programs in stored in the union database, and in the general manner discussed above in relation to step 206 of flowchart 200 of FIG. 2, and step 404 of flowchart 400 of FIG. 4. For example, media content metadata matcher and combiner 114 may use the title of each program as the second search index key when creating the search index. In other embodiments, however, media content metadata matcher and combiner 114 may create the search index using a metadata field other than the program title as the second search index key.

At step 606, source programs are identified, source programs comprising the programs of the plurality of programs that correspond to programs sourced from a predetermined one of the plurality of metadata sources and that correspond to a matched program in the union database, each of the identified source programs and its corresponding matched program comprising a matched pair. For example, and with reference to FIG. 1, embodiments of media content metadata matcher and combiner 114 may be enabled to add a programID corresponding to the combined program to the source program when the when the combined program is generated. Embodiments may then identify source programs merely by searching the plurality of programs for programs that a) originate from a predetermined source (e.g., EPG data provider 102A), and b) include a programID For example, consider the following hypothetical collections of programs. Suppose that a program may be represented by the following data structure: (sourceID, programID, Title, Year, Lead Actor), where sourceID is the ID of the source of the metadata, programID is an identifier unique to that particular instance of a program data structure, Title is the title of the program, Year is the year in which the program was released or aired, and Lead Actor is the leading actor or actress from the program.

Suppose further that we have the following plurality of programs provided from sources S1 and S2:

```
{           // plurality of programs
            (S1, id1, The Matrix, 1999, Keanu Reeves),
            (S1, id2, Aliens, 1986, Sigourney Weaver),
            (S2, id3, The Matrix, 1999, Laurence Fishburne),
            (S2, id4, Alien, 1979, Sigourney Weaver)
}
```

After matching programs, generating and storing combined programs in the union database, and storing the unmatched programs in the union database, the programs in the union database are:

```
{           // union database
            ([S1, S2], id5, The Matrix, 1999, [Keanu Reeves, Laurence Fishburne]),
            (S1, id2, Aliens, 1986, Sigourney Weaver),
            (S2, id4, Alien, 1979, Sigourney Weaver)
}
```

Furthermore, when the combined program having id5 was generated, the program with id1 from source S1, and id3 from S2 had id5 added to their program metadata as follows:

```
{           // plurality of programs
            (S1, id1, The Matrix, 1999, Keanu Reeves, id5),
            (S1, id2, Aliens, 1986, Sigourney Weaver)
            (S2, id3, The Matrix, 1999, Laurence Fishburne, id5),
            (S2, id4, Alien, 1979, Sigourney Weaver)
}
```

Returning now to the discussion of step 606 of flowchart 600, it may be appreciated from the above described hypothetical scenario that embodiments may identify source programs by searching the plurality of programs for programs that a) originate from the predetermined source (e.g., EPG data provider 102A), and b) include a programID Supposing our predetermined source is S1 in the example above, the source programs comprise:

```
{
            (S1 , id1, The Matrix, 1999, Keanu Reeves, id5)
}
```

Again with reference to the above described hypothetical, embodiments of media content metadata matcher and combiner 114 may easily identify the matched program corresponding to the source program since the programID of the matched program is included in the source program itself. Each pair of source program and corresponding matched program comprise a matched pair. Per the hypothetical above, the matched pairs comprise:

(S1, id1, The Matrix, 1999, Keanu Reeves, id5),
([S1, S2], id5, The Matrix, 1999, [Keanu Reeves, Laurence Fishburne])

It should be noted that the above described hypothetical pre-supposes that the union database does not already have matched entries. It may be the case, however, that a union database already exists, and newly received metadata is being merged into the existing matched programs of union database. For example, suppose that the union database includes the following matched program: ([S1, S2], id5, The Matrix, 1999, [Keanu Reeves, Laurence Fishburne]). Further suppose that the following program with id6 received from source S3 is matched to the existing program above: (S3, id6, The Matrix, 1999, Carrie-Anne Moss). In that instance, the metadata from program id6 will be merged into the matched program id5 above, and a new matched entry for the program pair will be created at the same time. Under this additional hypothetical, the matched pair would comprise: [(S3, id6, The Matrix, 1999, Carrie-Anne Moss, id5), ([S1, S2, S3], id5, The Matrix, 1999, [Keanu Reeves, Laurence Fishburne, Carrie-Anne Moss])].

Flowchart 600 of FIG. 6 continues at step 608. At step 608, the union database is searched by the metadata of each source program that corresponds to the second search index key of each source program to provide search results, the search results comprising second match candidates, and wherein each source program and each of its second match candidates comprise a candidate match pair. For example, and with reference to system 100 of FIG. 1 and flowchart 400 of FIG. 4, embodiments of media content metadata matcher and combiner 114 may be configured to determine second candidate matches in the manner discussed above in relation to step 406a of flowchart 400. In particular, second candidate matches may be determined by searching the second search index with the metadata of each source program that corresponds to the second search index key. For example, with reference to FIG. 1, embodiments of media content metadata matcher and combiner 114 may use the title metadata field for each source program, and search the second search index by that title name. Accordingly, such a search will return programs corresponding to programs whose titles are a close match to the title of the source program currently being evaluated for candidate matches. In embodiments, each of a source program and a corresponding candidate match comprise matched pairs.

At step 610, feature comparisons are computed for the corresponding metadata fields of each candidate match pair. For example, and with reference to FIG. 1, embodiments of media content metadata matcher and combiner 114 may calculate feature comparisons in the manner described above in conjunction with the discussion FIG. 1, and in particular, the discussion of media content metadata matcher and combiner 114. In embodiments, the metadata fields of each candidate match pair may first be scrubbed/normalized. Scrubbing/normalizing may comprise, for example, removing special characters from titles, credits, directors and other text fields, removing 'A', 'An' and 'The' from the beginning of a title, and/or shifting all text to lower case. These examples are merely illustrative, and other types of scrubbing or normalization may be employed as known in the art.

Flowchart 600 of FIG. 6 continues at step 612. At step 612, a machine learning model is constructed based at least in part on the feature comparisons and the matched pairs. For example, and with reference to FIG. 1, embodiments of media content metadata matcher and combiner 114 may be configured to construct a machine learning model such as, for example, a neural network based at least in part on the feature comparisons and the matched pairs. As known in the art, other types of classification/matching machine learning models are likewise suitable for use with embodiments.

At step 614, the machine learning model is trained with the program metadata. For example, and with reference to FIG. 1, embodiments of media content metadata matcher and combiner 114 are configured to feed program metadata, including both matched and unmatched programs, to the model until such time that suitable accuracy of the model is achieved.

Flowchart 600 concludes at step 616. At step 616, the machine learning model is stored for later use. For example, and with reference to FIG. 1, embodiments of media content metadata matcher and combiner 114 are configured to store the model in database 116.

Figure 7:
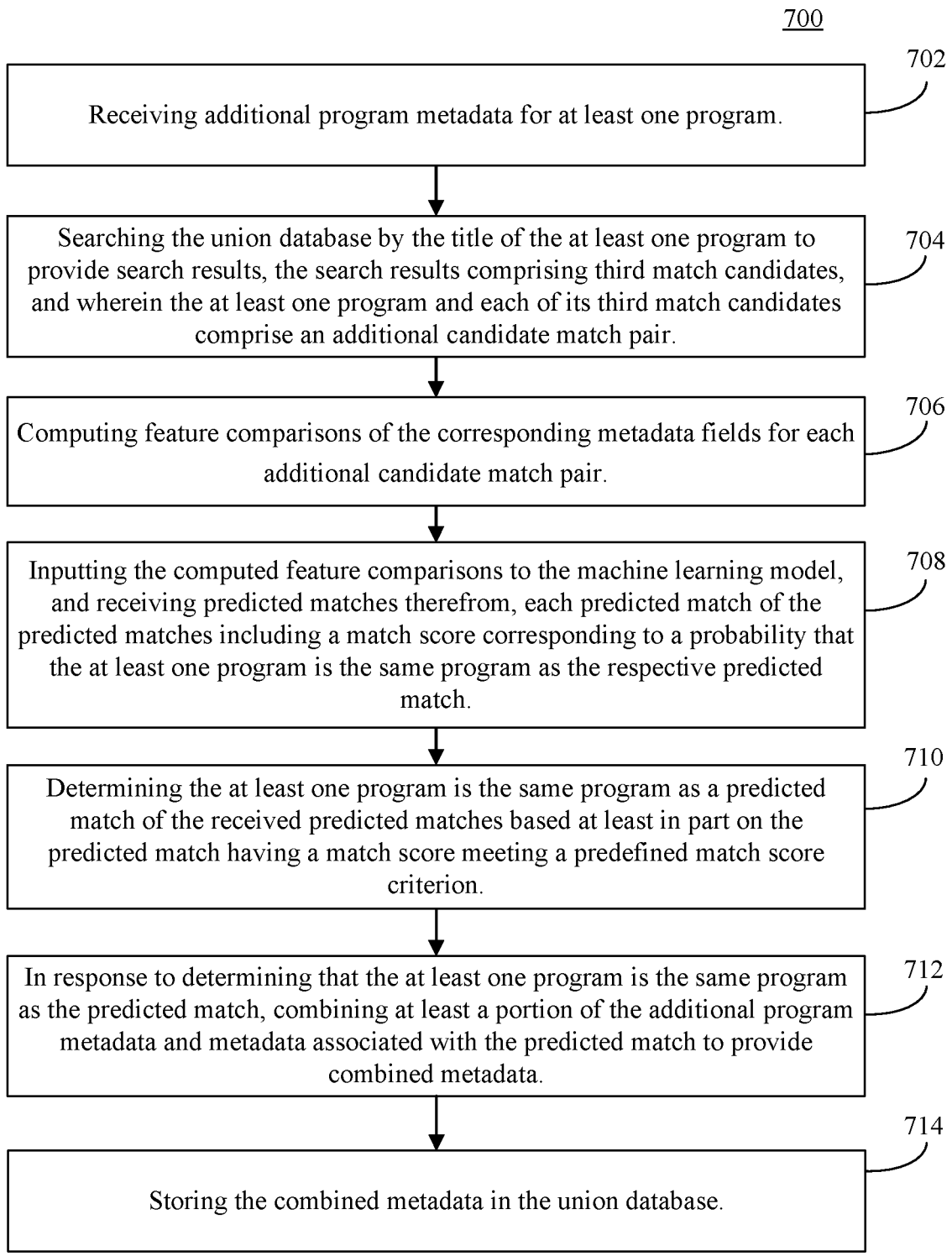
FIG. 7 depicts another flowchart of an example method for matching and combining program metadata to generate enhanced program metadata in accordance with embodiments described herein.

The operation of system 100 will now be further described as follows with respect to FIG. 7. In particular, FIG. 7 depicts another flowchart of an example method for matching and combining program metadata to generate enhanced program metadata, in accordance with an embodiment. In an embodiment, system 100 of FIG. 1 may operate according to the method of flowchart 700 and in conjunction with the methods of flowcharts 400 and 600. Further structural and operational embodiments will be apparent to persons skilled in the relevant art(s) based on the discussion regarding flowchart 700. The method of flowchart 700 is described as follows.

The method of flowchart 700 begins with step 702. In step 702, additional program metadata for at least one program is received. For example, and with reference to FIG. 1, metadata receiver 110 of media content search system 104 receives additional program metadata from, for example, one of EPG data providers 102A-102N. Such additional program metadata may comprise, for example, new program metadata associated with programs that have not yet been matched to other programs in the union database.

Flowchart 700 of FIG. 7 continues at step 704. At step 704, the union database is searched by the title of the at least one program to provide search results, the search results comprising third match candidates, and wherein the at least one program and each of its third match candidates comprise an additional candidate match pair. For example, and with reference to system 100 of FIG. 1, flowchart 400 of FIG. 4 and flowchart 600 of FIG. 6, embodiments of media content metadata matcher and combiner 114 may be configured to determine third candidate matches in the manner discussed above in relation to step 406a of flowchart 400. In particular, third candidate matches may be determined by searching the second search index with the metadata of the at least one program that corresponds to the second search index key. For example, with reference to FIG. 1, embodiments of media content metadata matcher and combiner 114 may use the title of the at least one program as provided with the additional program metadata received by metadata receiver 110, and search the second search index by that title name. Accordingly, such a search will return programs corresponding to programs whose titles are a close match to the title of the at least one program. In embodiments, the at least one program and each of its third match candidates comprise an additional candidate match pair analogous to the matched pairs described above in relation to step 606 of flowchart 600.

At step 706, feature comparisons are computed for the corresponding metadata fields for each additional candidate match pair. For example, and with reference to FIG. 1, embodiments of media content metadata matcher and combiner 114 may calculate feature comparisons in the manner described above in conjunction with the discussion FIG. 1, and in particular, the discussion of media content metadata matcher and combiner 114. In embodiments, the metadata fields of each additional candidate match pair may first be scrubbed/normalized. Scrubbing/normalizing may comprise, for example, removing special characters from titles, credits, directors and other text fields, removing 'A', 'An' and 'The' from the beginning of a title, and/or shifting all text to lower case. These examples are merely illustrative, and other types of scrubbing or normalization may be employed as known in the art.

Flowchart 700 of FIG. 7 continues at step 708. At step 708, the computed feature comparisons are input to the machine learning model, and predicted matches are received therefrom, each predicted match of the predicted matches including a match score corresponding to a probability that the at least one program is the same program as the respective predicted match. For example, and with reference to FIG. 1, embodiments of media content metadata matcher and combiner 114 are configured to load the trained machine learning model, and input the feature comparisons to the model. As known in the art, a suitably trained matching/classification machine learning model may return a score with each predicted match, wherein the score reflects the probability that the predicted match is the requested program.

At step 710, the at least one program is determined to be the same program as a predicted match of the received predicted matches based at least in part on the predicted match having a match score meeting a predefined match score criterion. For example, and with reference to FIG. 1, embodiments of media content metadata matcher and combiner 114 may determine that the at least one program is the same program as a predicted match where the match score of the predicted match exceeds a predefined threshold. Alternatively, embodiments of media content metadata matcher and combiner 114 may determine the at least one program is the same program as the predicted match having the highest match score. Of course, other criteria for determining whether the at least one program matches a predicted match may be employed as understood by those of skill in the art.

Flowchart 700 continues at step 712. At step 712, in response to determining that the at least one program is the same program as the predicted match, at least a portion of the additional program metadata and metadata associated with the predicted match are combined to provide combined metadata. For example, and with reference to FIG. 1, flowchart 400 of FIG. 4, and the discussion above as it relates to step 406c of flowchart 400, the at least one program and the predicted match may be considered "matched programs" in the context of, for example, the discussion of step 406c above. Accordingly, merging the fields of such programs may proceed as per the teachings of that portion of this description.

Flowchart 700 concludes at step 714. At step 714, the combined metadata is stored in the union database.

III. Example Computer System Implementation

The computing device of FIG. 1 and/or the components included therein may be implemented in hardware, or any combination of hardware with software and/or firmware. For example, the computing device of FIG. 1 and/or the components included therein may be implemented as computer program code configured to be executed in one or more processors. In another example, the computing device of FIG. 1 and/or the components included therein may be implemented as hardware (e.g., hardware logic/electrical circuitry), or any combination of hardware with software (computer program code configured to be executed in one or more processors or processing devices) and/or firmware.

Figure 8:
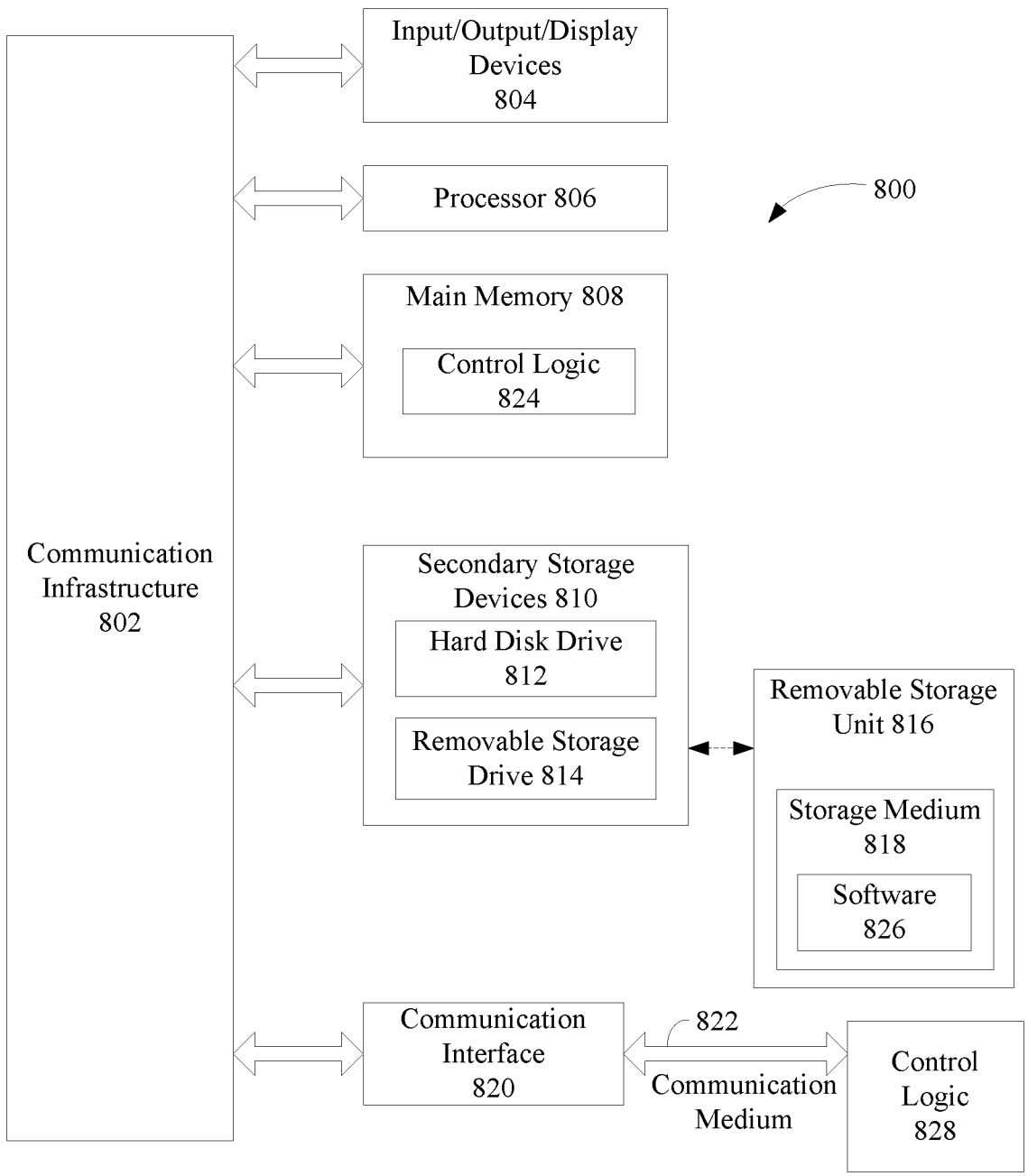
FIG. 8 is a block diagram of an example computer system in which embodiments may be implemented.

The embodiments described herein, including systems, methods/processes, and/or apparatuses, may be implemented using well known servers/computers, such as computer 800 shown in FIG. 8. For example, the computing device of FIG. 1 and/or the components included therein, and each of the steps of flowcharts 200-700 as depicted in FIGS. 2-7, respectively can each be implemented using one or more computers 800.

Computer 800 can be any commercially available and well known computer capable of performing the functions described herein, such as computers available from International Business Machines, Apple, Sun, HP, Dell, Cray, etc. Computer 800 may be any type of computer, including a desktop computer, a server, etc.

As shown in FIG. 8, computer 800 includes one or more processors (also called central processing units, or CPUs), such as a processor 806. Processor 806 may include the computing device of FIG. 1 and/or the components included therein, for example, though the scope of the embodiments is not limited in this respect. Processor 806 is connected to a communication infrastructure 802, such as a communication bus. In some embodiments, processor 806 can simultaneously operate multiple computing threads.

Computer 800 also includes a primary or main memory 808, such as random access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disc (CD), digital versatile disc (DVD), Blu-ray™ disc, optical storage disk, memory stick, memory card, or any other computer data storage device. Removable storage drive 814 reads from and/or writes to removable storage unit 816 in a well-known manner.

Computer 800 also includes input/output/display devices 804, such as monitors, keyboards, pointing devices, etc.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as local area networks (LANs), wide area networks (WANs), the Internet, etc. Network interface 820 may interface with remote sites or networks via wired or wireless connections. Examples of communication interface 822 include but are not limited to a modem, a network interface card (e.g., an Ethernet card), a communication port, a Personal Computer Memory Card International Association (PCMCIA) card, etc.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing the computing device of FIG. 1 and/or the components included therein, and/or flowchart 200, and/or flowchart 300, and/or flowchart 400, and/or flowchart 500, and/or flowchart 600, and/or flowchart 700, and/or further embodiments described herein. Embodiments of the invention are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 8 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

CONCLUSION

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims.

Accordingly, the breadth and scope of the disclosed subject matter should not be limited by any of the above-described exemplary embodiments, but should be defined only in accordance with the following claims and their equivalents.

What is claimed is:

1. A method of matching and combining program metadata to generate enhanced program metadata, comprising:

receiving and storing program metadata for a plurality of programs from a plurality of metadata sources, the program metadata for each of the plurality of programs comprising a plurality of metadata fields;

building a first search index of the plurality of programs, the first search index keyed by a first search index key corresponding to at least one of the plurality of metadata fields; and for each one of the plurality of programs:

determining first candidate matches by searching the search index with the metadata of the respective one of the plurality of programs that corresponds to the first search index key;

comparing the respective metadata fields of the respective one of the plurality of programs and each first candidate match to determine whether the programs corresponding thereto are the same program;

in response to determining that the respective one of the plurality of programs and a respective one of the first candidate matches are the same program, generating a combined program including enhanced program metadata by combining at least a portion of the program metadata associated with each program; and storing the combined program in a union database;

for each of the plurality of programs for which no combined program was generated, storing the program in the union database;

building a second search index of the programs stored in the union database, the second search index keyed by a second search index key that corresponds to at least one of the plurality of metadata fields;

identifying as source programs, the programs of the plurality of programs that correspond to programs sourced from a predetermined one of the plurality of metadata sources and that correspond to a combined program in the union database, each of the identified source programs and its corresponding combined program comprising a matched pair;

searching the union database with the metadata of each source program that corresponds to the second search index key of each source program to provide search results, the search results comprising second match candidates, and wherein each source program and each of its second match candidates comprise a candidate match pair;

computing feature comparisons of the corresponding metadata fields for each candidate match pair;

constructing a machine learning model based at least in part on the feature comparisons and the matched pairs;

training the machine learning model with the program metadata; and storing the machine learning model.

2. The method of claim 1, wherein each of the plurality of metadata sources comprises one of:

an entertainment content metadata provider;

a video content provider;

an electronic program guide (EPG) data provider;

a Web-based information provider;

an audio content provider;

a recorded content provider;
network-based content;
a digital video recorder (DVR);
a personal video recorder (PVR);
a set-top box;
a media server;
a personal computer; or
a scraper of web-based metadata.

3. The method of claim 1, wherein the method is performed by one or more servers and wherein at least one of the plurality of metadata sources comprises a first end user device that is connected to at least one of the one or more servers via a network.

4. The method of claim 3, wherein the first end user device comprises:
a digital video recorder (DVR);
a personal video recorder (PVR);
a set-top box;
a media server;
a mobile device; or
a personal computer.

5. The method of claim 3, wherein the first end user device comprises a switching device that is connected to a second end user device, and that collects at least some of the program metadata therefrom.

6. The method of claim 1, wherein comparing the respective metadata fields of the respective one of the plurality of programs and each first candidate match to determine whether the programs corresponding thereto are the same program comprises one or more of:
determining if a title of each program matches exactly with one another;
determining a distance between titles of each program;
determining if the title of each program partially match;
comparing the release dates of each program;
comparing the release years of each program;
comparing the cast and crew information for each program;
comparing the premiere dates for each program;
comparing the first airdate of each program;
comparing the first audio languages of each program;
comparing the season count of each program;
comparing the number of episodes of each program; or
comparing the over-the-top (OTT) links in each program.

7. The method of claim 1, further comprising:
receiving a request for a program from an end user device; and
in response to the request:
identifying the requested program based at least on the metadata of the combined program stored in the union database; and
presenting at least a portion of the metadata of the combined program to the end user device for display to a user, the presented portion of the metadata including metadata enabling accessing media corresponding to the combined program.

8. The method of claim 1, wherein the enhanced program metadata includes a verified over-the-top (OTT) link.

9. The method of claim 1, further comprising:
receiving additional program metadata for at least one program;
searching the union database by the title of the at least one program to provide search results, the search results comprising third match candidates, and wherein the at least one program and each of its third match candidates comprise an additional candidate match pair;
computing feature comparisons of the corresponding metadata fields for each additional candidate match pair;
inputting the computed feature comparisons to the machine learning model, and receiving predicted matches therefrom, each predicted match of the predicted matches including a match score corresponding to a probability that the at least one program is the same program as the respective predicted match;
determining the at least one program is the same program as a predicted match of the received predicted matches based at least in part on the predicted match having a match score meeting a predefined match score criterion; and
in response to determining that the at least one program is the same program as the predicted match, combining at least a portion of the additional program metadata and metadata associated with the predicted match to provide combined metadata; and
storing the combined metadata in the union database.

10. A system for matching and combining program metadata to generate enhanced program metadata, comprising:
one or more processors; and
one or more memory devices connected to the one or more processors, the one or more memory devices storing computer program logic for execution by the one or more processors, the computer program logic including:
a metadata receiver configured to:
receive and store program metadata for a plurality of programs from a plurality of metadata sources, the program metadata for each of the plurality of programs comprising a plurality of metadata fields;
a media content metadata matcher and combiner configured to:
build a first search index of the plurality of programs, the first search index keyed by a first search index key corresponding to at least one of the plurality of metadata fields;
for each one of the plurality of programs:
determine first candidate matches by searching the search index with the metadata of the respective one of the plurality of programs that corresponds to the first search index key;
compare the respective metadata fields of the respective one of the plurality of programs and each first candidate match to determine whether the programs corresponding thereto are the same program;
in response to determining that the respective one of the plurality of programs and a respective one of the first candidate matches are the same program, generate a combined program including enhanced program metadata by combining at least a portion of the program metadata associated with each program; and
store the combined program in a union database;
for each of the plurality of programs for which no combined program was generated, store the program in the union database;
build a second search index of the programs stored in the union database, the second search index keyed by a second search index key that corresponds to at least one of the plurality of metadata fields;
identify as source programs, the programs of the plurality of programs that correspond to programs sourced from a predetermined one of the plurality of metadata sources and that correspond to a combined program in the union database, each of the identified source programs and its corresponding combined program comprising a matched pair;

search the union database with the metadata of each source program that corresponds to the second search index key of each source program to provide search results, the search results comprising second match candidates, and wherein each source program and each of its second match candidates comprise a candidate match pair;

compute feature comparisons of the corresponding metadata fields for each candidate match pair;

construct a machine learning model based at least in part on the feature comparisons and the matched pairs;

train the machine learning model with the program metadata; and store the machine learning model.

11. The system of claim 10, wherein each of the plurality of metadata sources comprises one of:
an entertainment content metadata provider;
a video content provider;
an electronic program guide (EPG) data provider;
a Web-based information provider;
an audio content provider;
a recorded content provider;
network-based content;
a digital video recorder (DVR);
a personal video recorder (PVR);
a set-top box;
a media server;
a personal computer; or
a scraper of web-based metadata.

12. The system of claim 10, wherein the computer program logic comprising the metadata receiver and computer program logic comprising the media content metadata matcher and combiner are each configured to be executed by the one or more processors by one or more servers and wherein at least one of the plurality of metadata sources comprises a first end user device that is connected to at least one of the one or more servers via a network.

13. The system of claim 10, wherein the media content metadata matcher and combiner is configured to compare the respective metadata fields of the respective one of the plurality of programs and each first candidate match to determine whether the programs corresponding thereto are the same program by performing one or more of:
determining if a title of each program matches exactly with one another;
determining a distance between titles of each program;
determining if the title of each program partially match;
comparing the release dates of each program;
comparing the release years of each program;
comparing the cast and crew information for each program;
comparing the premiere dates for each program;
comparing the first airdate of each program;
comparing the first audio languages of each program;
comparing the season count of each program;
comparing the number of episodes of each program; or
comparing the over-the-top (OTT) links in each program.

14. The system of claim 10, wherein the computer program logic further comprises a search utility configured to:
receive a request for a program from an end user device; and in response to the request:
identify the program based at least on the metadata of the combined program stored in the union database; and
present at least a portion of the metadata of the combined program to the end user device for display to a user, the presented portion of the metadata including metadata enabling accessing media corresponding to the combined program.

15. The system of claim 10, wherein the enhanced program metadata includes a verified over-the-top (OTT) link.

16. The system of claim 10, wherein the media content metadata matcher and combiner is further configured to:
receive additional program metadata for at least one program;
search the union database by the title of the at least one program to provide search results, the search results comprising third match candidates, and wherein the at least one program and each of its third match candidates comprise an additional candidate match pair;
compute feature comparisons of the corresponding metadata fields for each additional candidate match pair;
input the computed feature comparisons to the machine learning model, and receive predicted matches therefrom, each predicted match of the predicted matches including a match score corresponding to a probability that the at least one program is the same program as the respective predicted match;
determine the at least one program is the same program as a predicted match of the received predicted matches based at least in part on the predicted match having a match score meeting a predefined match score criterion; and
in response to determining that the at least one program is the same program as the predicted match, combine at least a portion of the additional program metadata and metadata associated with the predicted match to provide combined metadata; and
storing the combined metadata in the union database.

17. A computer program product comprising a computer-readable memory device having computer program logic recorded thereon that when executed by at least one processor of a computing device causes the at least one processor to perform operations, the operations comprising:
receiving and storing program metadata for a plurality of programs from a plurality of metadata sources, the program metadata for each of the plurality of programs comprising a plurality of metadata fields;
building a first search index of the plurality of programs, the first search index keyed by a first search index key corresponding to at least one of the plurality of metadata fields; and
for each one of the plurality of programs:
determining first candidate matches by searching the search index with the metadata of the respective one of the plurality of programs that corresponds to the first search index key;
comparing the respective metadata fields of the respective one of the plurality of programs and each first candidate match to determine whether the programs corresponding thereto are the same program;
in response to determining that the respective one of the plurality of programs and a respective one of the first candidate matches are the same program, generating a combined program including enhanced program metadata by combining at least a portion of the program metadata associated with each program;

storing the combined program in a union database;

for each of the plurality of programs for which no combined program was generated, storing the program in the union database;

building a second search index of the programs stored in the union database, the second search index keyed by a second search index key that corresponds to at least one of the plurality of metadata fields;

identifying as source programs, the programs of the plurality of programs that correspond to programs sourced from a predetermined one of the plurality of metadata sources and that correspond to a combined program in the union database, each of the identified source programs and its corresponding combined program comprising a matched pair;

searching the union database with the metadata of each source program that corresponds to the second search index key of each source program to provide search results, the search results comprising second match candidates, and wherein each source program and each of its second match candidates comprise a candidate match pair;

computing feature comparisons of the corresponding metadata fields for each candidate match pair;

constructing a machine learning model based at least in part on the feature comparisons and the matched pairs;

training the machine learning model with the program metadata; and storing the machine learning model.

18. The method of claim 8, wherein the verified over-the-top (OTT) link comprises a link that is valid or otherwise functional for enabling download, streaming or other access to OTT content.

19. The system of claim 15, wherein the verified over-the-top (OTT) link comprises a link that is valid or otherwise functional for enabling download, streaming or other access to OTT content.

20. The computer program product of claim 17, wherein the enhanced program metadata includes a verified over-the-top (OTT) link comprising a link that is valid or otherwise functional for enabling download, streaming or other access to OTT content.

* * * * *